(12) United States Patent
Miyazaki

(10) Patent No.: US 10,035,900 B2
(45) Date of Patent: Jul. 31, 2018

(54) RUBBER COMPOSITION FOR TREADS AND PNEUMATIC TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/503,967

(22) PCT Filed: Jul. 29, 2015

(86) PCT No.: PCT/JP2015/071430
§ 371 (c)(1),
(2) Date: Feb. 14, 2017

(87) PCT Pub. No.: WO2016/031476
PCT Pub. Date: Mar. 3, 2016

(65) Prior Publication Data
US 2017/0253728 A1    Sep. 7, 2017

(30) Foreign Application Priority Data

Aug. 28, 2014  (JP) ................. 2014-174233

(51) Int. Cl.
C08L 9/06   (2006.01)
C08K 3/22   (2006.01)
C08K 13/02  (2006.01)

(52) U.S. Cl.
CPC ...... *C08K 13/02* (2013.01); *C08K 2003/2206* (2013.01); *C08K 2003/2217* (2013.01);
(Continued)

(58) Field of Classification Search
None
See application file for complete search history.

(56) References Cited

U.S. PATENT DOCUMENTS 6,242,522 B1    6/2001  Ezawa et al.
6,336,486 B1 *  1/2002  Iwasaki ............. B60C 1/0016
                                                152/209.18
(Continued)

FOREIGN PATENT DOCUMENTS

CN    1169398 A    1/1998
CN    102443204 A  5/2012
(Continued)

OTHER PUBLICATIONS

International Search Report for PCT/JP2015/071430 dated Oct. 20, 2015.
(Continued)

*Primary Examiner* — Richard A Huhn
(74) *Attorney, Agent, or Firm* — Birch, Stewart, Kolasch & Birch, LLP

(57) ABSTRACT

Provided are: a rubber composition for treads which contains a diene rubber in the rubber component and can simultaneously achieve blowing resistance during dry running, wet grip performance and abrasion resistance; and a pneumatic tire including a tread formed from the rubber composition for treads. The rubber composition contains: a diene rubber including styrene-butadiene rubber; zinc dithiophosphate; an inorganic filler including at least one selected from the group consisting of: a compound of the formula: $mM \cdot xSiO_y \cdot zH_2O$ wherein M represents at least one metal selected from the group consisting of Al, Mg, Ti, Ca, and Zr, or an oxide or hydroxide of the metal, m represents an integer of 1-5, x represents an integer of 0-10, y represents an integer of 2-5, and z represents an integer of 0-10; magnesium sulfate; and silicon carbide, and having a BET
(Continued)

value of 5-120 m²/g and a linseed oil absorption of 30-80 mL/100 g; and sulfur, wherein, per 100 parts by mass of the diene rubber, there are 0.2-15 parts by mass of the zinc dithiophosphate, 1-70 parts by mass of the inorganic filler, and less than 2.5 parts by mass of zinc oxide.

7 Claims, 2 Drawing Sheets

(52) U.S. Cl.
CPC ............... *C08K 2003/2224* (2013.01); *C08K 2003/2227* (2013.01); *C08K 2003/2237* (2013.01); *C08K 2003/2244* (2013.01); *C08K 2201/006* (2013.01); *C08L 9/06* (2013.01); *C08L 2666/54* (2013.01)

(56) References Cited

U.S. PATENT DOCUMENTS

| | | | |
|---|---|---|---|
| 2002/0169243 A1 | 11/2002 | Nippa | |
| 2004/0030027 A1* | 2/2004 | Konno | C08K 3/22 524/493 |

FOREIGN PATENT DOCUMENTS

| | | |
|---|---|---|
| EP | 0864604 A2 | 9/1998 |
| EP | 0869016 A2 | 10/1998 |
| EP | 1323775 A1 | 7/2003 |
| EP | 3165566 A1 | 5/2017 |
| EP | 3228657 A1 | 10/2017 |
| JP | 11-268505 A | 10/1999 |
| JP | 11-334310 A | 12/1999 |
| JP | 2002-332381 A | 11/2002 |
| JP | 4596646 B2 | 12/2010 |
| JP | 2013-166826 A | 8/2013 |
| WO | WO 02/20655 A1 | 3/2002 |

OTHER PUBLICATIONS

Written Opinion of the International Searching Authority for PCT/JP2015/071430 dated Oct. 20, 2015.
English translation of the Chinese Office Action for Application No. 201580043637.1, dated Mar. 14, 2018.
Li, "Carbon Black Production and Application Manual," Chemical Industry Press, Sep. 30, 2000, 4 pages.
Ma et al., "Comparative study on properties of SBR1721 and SBR1712," Tire Industry, 2003, pp. 277-282, with an English abstract.
Machine translation of CN-1386786-A published on Dec. 25, 2002.

* cited by examiner

During running      After running

RUBBER COMPOSITION FOR TREADS AND PNEUMATIC TIRE

TECHNICAL FIELD

The present invention relates to a rubber composition for treads, and a pneumatic tire that includes a tread formed from the rubber composition for treads.

BACKGROUND ART

Pneumatic tires are formed from a number of different components, including treads and sidewalls. These components impart their respective properties to the pneumatic tires. Treads which make contact with road surfaces, among other components, need to have grip performance, abrasion resistance, tensile properties, and other properties.

Rubber compositions for use in treads of pneumatic tires are usually prepared by adding fillers such as silica or carbon black, and softeners such as low temperature plasticizers, process oils, liquid resins, or resins having a softening point of 160° C. or lower to a rubber component including a diene rubber. Further, thereto are added sulfur and zinc oxide, and optionally vulcanization accelerators such as thiazole vulcanization accelerators (e.g. TBBS, CBS), thiuram vulcanization accelerators (e.g. TBZTD, ZTC), or guanidine vulcanization accelerators (e.g. DPG), and they are kneaded and formed, followed by crosslinking by heat pressing in a vulcanizer to produce pneumatic tires.

For example, Patent Literature 1 discloses a technique that involves incorporation of an alkoxysilane polysulfide, zinc dithiophosphate, and a guanidine derivative with a diene elastomer to promote a coupling reaction, thereby improving abrasion resistance and tensile properties.

It has been known that the use of a diene rubber in the rubber component provides good durability while ensuring good handling stability, fuel economy, and elongation at break, but unfortunately leads to the occurrence of blowing (porosity) during high-temperature running. In particular, in the case of compositions which incorporate at least a certain amount of carbon black or softeners with a diene rubber in order to achieve high grip performance or abrasion resistance, blowing easily occurs because the compositions show high heat build-up and are thus susceptible to breakage of crosslinks and cannot withstand the inflation pressure of the volatile components in the rubber. For racing tires, since in summer the temperature of the tire tread rises up to 100° C. and the internal temperature of the tread rises up to 120° C., no occurrence of blowing is desired even when the tires are run approximately 40 laps of a circuit at such high temperatures. If blowing occurs in the tread during a race, rubber stiffness decreases so that running lap time deteriorates, and further the tread portion may even be broken, chipped, or separated. However, there has not been established a technique that prevents blowing during dry running by the use of a rubber component including a diene rubber.

Meanwhile, the addition of aluminum hydroxide is proposed as a method for imparting wet grip performance to a tread. However, this method is disadvantageous in that it deteriorates abrasion resistance or abrasion appearance (i.e. grainy peaks like waves) after abrasion, and is therefore rarely applied to tires for general public roads.

The deterioration of abrasion appearance after abrasion, specifically, the formation of taller wave-like grainy peaks (ripples), suggests that the rubber has been subjected to excessive tearing or tension during running. In this case, a decrease in abrasion index is usually observed.

CITATION LIST

Patent Literature

Patent Literature 1: JP 4596646 B

SUMMARY OF INVENTION

Technical Problem

The present invention aims to solve the aforementioned problems and provide a rubber composition for treads which contains a diene rubber in the rubber component and can simultaneously achieve blowing resistance during dry running, wet grip performance, and abrasion resistance; and a pneumatic tire including a tread formed from the rubber composition for treads.

Solution to Problem

One aspect of the present invention relates to a rubber composition for treads, containing:
a diene rubber including styrene-butadiene rubber;
zinc dithiophosphate;
an inorganic filler which includes at least one selected from the group consisting of a compound represented by the formula below, magnesium sulfate, and silicon carbide, and has a BET value of 5 to 120 m²/g and a linseed oil absorption of 30 to 80 mL/100 g; and
sulfur,
wherein, per 100 parts by mass of the diene rubber, there are 0.2 to 15 parts by mass of the zinc dithiophosphate, 1 to 70 parts by mass of the inorganic filler, and less than 2.5 parts by mass of zinc oxide,
the formula being

$$mM \cdot xSiO_y \cdot zH_2O$$

wherein M represents at least one metal selected from the group consisting of Al, Mg, Ti, Ca, and Zr, or an oxide or hydroxide of the metal; m represents an integer of 1 to 5; x represents an integer of 0 to 10; y represents an integer of 2 to 5; and z represents an integer of 0 to 10.

In the rubber composition for treads of the present invention, the inorganic filler preferably has a BET value of 10 to 120 m²/g and a linseed oil absorption of 30 to 80 mL/100 g.

In the rubber composition for treads of the present invention, the inorganic filler is preferably aluminum hydroxide.

In the rubber composition for treads of the present invention, the diene rubber preferably includes 60% by mass or more of a styrene-butadiene rubber having a styrene content of 19% to 60%.

The rubber composition for treads of the present invention preferably contains a carbon black having a BET value of 151 m²/g or more in an amount of 5 to 130 parts by mass per 100 parts by mass of the diene rubber.

The rubber composition for treads of the present invention is preferably free of zinc oxide.

Another aspect of the present invention relates to a pneumatic tire, including a tread formed from the rubber composition for treads of the present invention.

Advantageous Effects of Invention

The present invention provides a rubber composition for treads whose rubber component includes a diene rubber and which contains zinc dithiophosphate and sulfur but has a zinc oxide content below a certain level, and further contains an inorganic filler having specific BET value and linseed oil absorption ranges. Thus, a pneumatic tire including a tread formed from the rubber composition can simultaneously achieve excellent blowing resistance during dry running, high wet grip performance, and high abrasion resistance.

DESCRIPTION OF EMBODIMENTS

Figure 1:
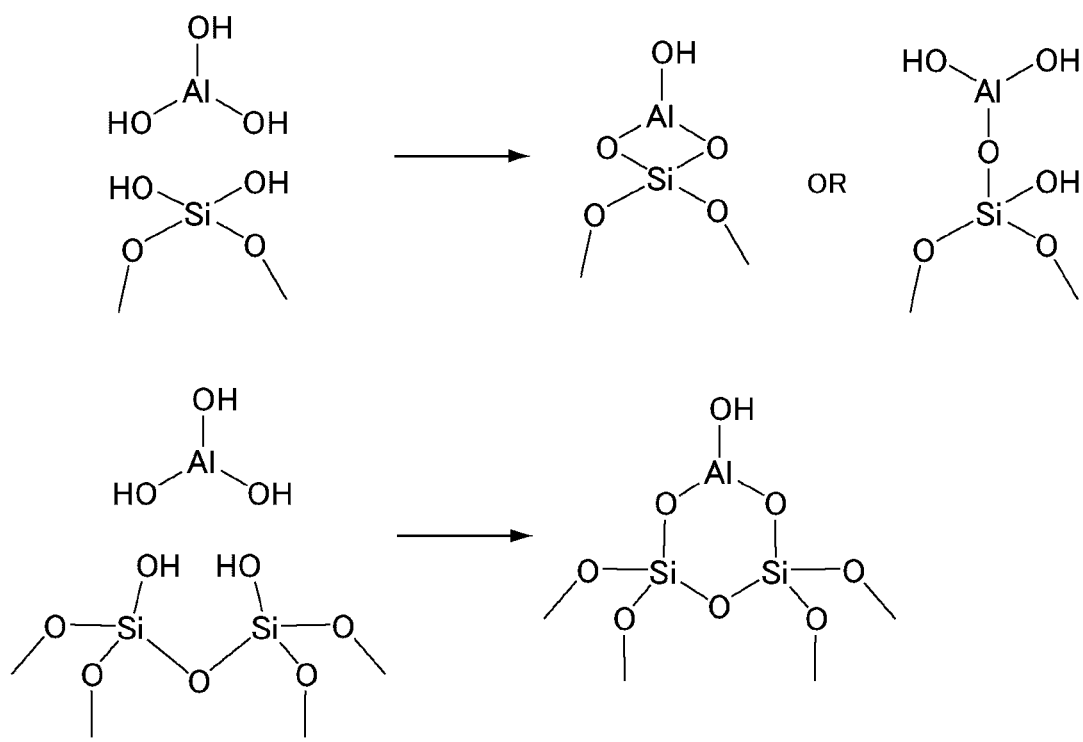
FIG. 1 shows a reaction between aluminum and silica during the kneading or vulcanization of rubber compounds, or an instantaneous reaction between aluminum hydroxide on the tire surface and silica on the road surface.
Figure 2:
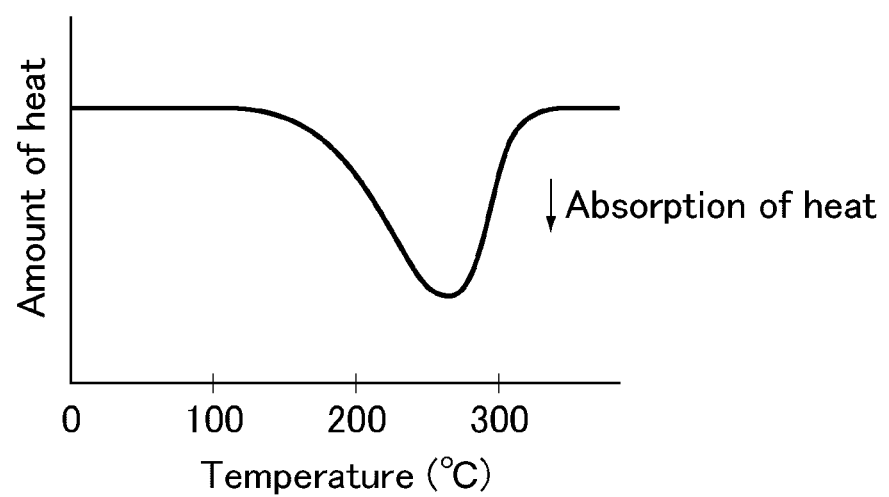
FIG. 2 shows an image of a curve of differential scanning calorimetry of aluminum hydroxide.

The rubber composition for treads of the present invention (hereinafter, also referred to simply as "rubber composition") can prevent the occurrence of blowing during dry running by incorporating zinc dithiophosphate with a diene rubber including styrene-butadiene rubber (SBR) while adjusting the zinc oxide content to below a certain level. The rubber composition achieves high wet grip performance and high abrasion resistance by incorporating an inorganic filler having specific BET value and linseed oil absorption ranges.

The present inventor studied the reason why blowing can easily occur during dry running when a pneumatic tire is formed from a diene rubber including SBR. As a result, the present inventor has found that this is due to factors such as the crosslinking properties of the diene rubber including high styrene content SBR, i.e. delayed curing reaction and non-uniform crosslinking, and high heat build-up therein.

Since the molecular growth step in the production of SBR is restricted, higher styrene content makes it difficult to randomly locate styrene groups. Specifically, if the styrene content is more than 15%, the number of styrene groups adjacent to one another in the polymer chain increases. A portion in which approximately 2 to 5 styrene groups are gathered adjacent to each other becomes so hard that the free movement of the polymer decreases and thus the frequency of its contact with composites of sulfur and vulcanization accelerators decreases. Therefore, the crosslinking reaction is less likely to occur. In other words, in a SBR with at least a certain styrene content, sulfur crosslinking is concentrated in the butadiene portion containing a small amount of styrene groups in the polymer chain, thereby making it difficult to produce uniform crosslinking. Particularly in a SBR having a molecular weight of 1,000,000 or more, the portion in which styrene groups are gathered adjacent to each other easily becomes hard like a ball and the inside of the ball is hardly crosslinked. If such a diene rubber containing SBR is incorporated with carbon black and softeners in order to achieve high grip performance and high abrasion resistance, sulfur and vulcanization accelerators are adsorbed by the softeners so that the curing reaction slows down. Moreover, compositions incorporating a large amount of carbon black and softeners necessarily have a high total filler content and thus tend to have a high total phr so that the vulcanizing agents and the rubber component are less likely to come into contact with each other. Therefore, the curing reaction further slows down. In conclusion, in the diene rubber including SBR, extremely non-uniform crosslinking with low crosslink density is only produced due to the crosslinking properties of SBR itself as well as the curing reaction being delayed by the incorporation of carbon black and softeners.

If such non-uniformly crosslinked rubber with low crosslink density contains a large amount of carbon black and softeners in order to improve grip performance and abrasion resistance, a loosely crosslinked network portion cannot withstand the inflation pressure of the volatile components or trapped air in the rubber due to the effects of the high temperatures during running and the stress resulting from mechanical strain, and as a result, honeycomb pores are formed in the loosely crosslinked network portion. This is considered to cause blowing.

As a result of extensive research, the present inventor has found that, even when a diene rubber including SBR is used, the occurrence of blowing during dry running can be prevented by incorporating zinc dithiophosphate while adjusting the zinc oxide content to below a certain level.

Zinc dithiophosphate contains zinc and produces a higher cure accelerating effect than zinc oxide. It shows an extremely high cure accelerating effect particularly when used in combination with vulcanization accelerators. The use of zinc dithiophosphate is considered to allow even a composition incorporating at least a certain amount of carbon black and softeners with a diene rubber including SBR to undergo uniform crosslinking with proper crosslink density. Due to such uniform crosslinking with proper crosslink density, it is possible to effectively prevent the occurrence of blowing during dry running while maintaining high grip performance, abrasion resistance, and tensile properties. It is also considered that when the tire temperature (rubber temperature) rises to 80° C. to 120° C. during running, a higher degree of re-crosslinking between the polymers occurs than when sulfur and vulcanization accelerators are used alone.

The rubber composition of the present invention achieves high wet grip performance and high abrasion resistance by incorporating an inorganic filler having specific BET value and linseed oil absorption ranges with a diene rubber including styrene-butadiene rubber (SBR).

The addition of an inorganic filler such as aluminum hydroxide having a specific BET value and a specific linseed oil absorption improves wet grip performance. This effect is presumably produced by the following effects (1) to (4).

(1) During kneading, the added inorganic filler such as aluminum hydroxide ($Al(OH)_3$) is partially converted to alumina ($Al_2O_3$) having a Mohs hardness equal to or higher than that of silica, or the inorganic filler such as aluminum hydroxide binds to silica (through covalent bonding or dehydration) and is immobilized by the finely-dispersed silica chains in the rubber compound. Such metal oxide masses or inorganic filler is considered to provide an anchoring effect to the micro-roughness (having a pitch of tens of micrometers) of the aggregates on the road surface, thereby enhancing wet grip performance.

(2) As a result of the contact (friction) between silicon dioxide on the road surface and the inorganic filler such as aluminum hydroxide on the tire surface during running, covalent bonds are considered to be instantaneously formed as shown in FIG. 1, thereby improving wet grip performance.

(3) A part of the tire surface on the wet road makes contact with the road surface through a water film. Usually, such a water film is considered to be evaporated by the friction heat generated in areas where the tire makes direct contact with the road surface. When aluminum hydroxide, for example, is incorporated, however, the friction heat is considered to contribute to the progress of an endothermic reaction of aluminum hydroxide on the tire surface as shown by "$Al(OH)_3 \rightarrow 1/2 Al_2O_3 + 3/2 H_2O$", thereby resulting in reduced evaporation of the water film (moisture). In the case where the water film is evaporated, a void space is formed between the tire surface and the road surface and thus the road surface/tire contact area is reduced, resulting in a decrease in wet grip performance.

Figure 3:
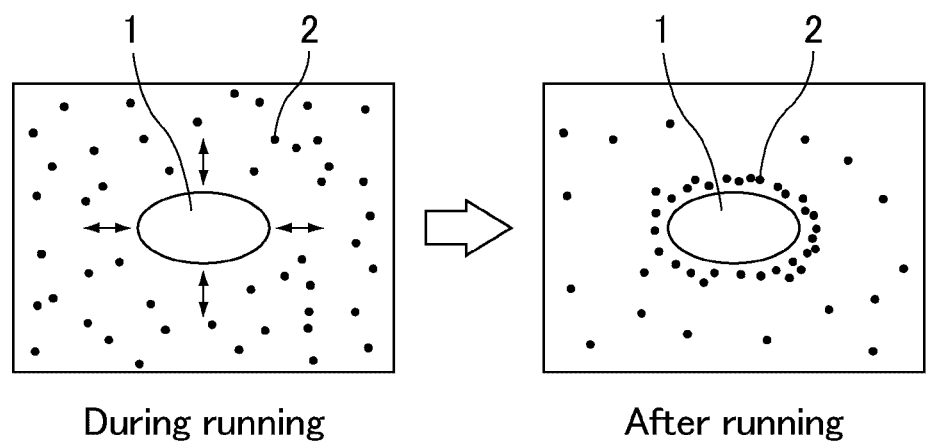
FIG. 3 shows a schematic view illustrating the state of inorganic filler particles in rubber in the vicinity of the contact area with the road surface (in the vicinity of the tread surface) during running.

(4) FIG. 3 shows a schematic view illustrating the state of inorganic filler particles in rubber in the vicinity of the contact area with the road surface (in the vicinity of the tread surface) during running. As shown in FIG. 3, when the phenomenon (1) or (2) occurs, the inorganic filler particle 1 vibrates at high frequency during running. This high frequency vibration promotes blooming of adhesive components 2, such as grip resins and liquid components, in the adjacent rubber compositions. As a result, the amount of the adhesive components 2 around the inorganic filler particle 1 is increased compared to that in other parts without inorganic filler, which improves wet grip performance.

The rubber composition of the present invention further achieves improved dry grip performance by addition of an inorganic filler such as aluminum hydroxide having a specific BET value and a specific linseed oil absorption. Particularly in running tests, many professional drivers have made the following comments on the incorporation of inorganic filler: the tread surface makes close contact with the road surface and shows a behavior as if grip resins bloomed to the surface. The reason for this is supposed as follows.

When inorganic filler is incorporated into a rubber composition, a high tension is applied to the surface of the tread rubber particularly during small radius turning or drifting, which causes the tread rubber to vibrate at high frequency. When the high frequency vibration reaches 1000 Hz or higher, (1) grip resins or liquid components bloom to the interface between the inorganic filler and the rubber component, thereby promoting road surface grip, (2) preferably, the inorganic filler physically or chemically binds to the neighboring silica and carbon black so that no large voids appear around the inorganic filler even during running, and (3) the inorganic filler in the form of fine particles having a specific BET value increases the hysteresis of the rubber composition. These effects are supposed to contribute to improvement of dry grip performance.

Although wet grip performance is improved by the effects caused by the addition of such conventional inorganic filler such as aluminum hydroxide, abrasion resistance or abrasion appearance after abrasion usually deteriorates in this case. Accordingly, it is difficult to achieve a balanced improvement in these properties. In the present invention, since an inorganic filler such as aluminum hydroxide having a predetermined BET value and a predetermined linseed oil absorption is incorporated, wet grip performance is improved while reducing the deterioration of abrasion resistance and abrasion appearance after abrasion and maintaining good properties. Thus, a balanced improvement in these properties is achieved.

The rubber composition of the present invention contains a diene rubber including SBR in the rubber component. The use of the diene rubber in the rubber component can provide good durability while ensuring good handling stability, fuel economy, and elongation at break.

Non-limiting examples of the SBR include emulsion polymerized SBR (E-SBR) and solution polymerized SBR (S-SBR). The SBR may or may not be oil extended. Particularly in view of abrasion resistance, oil extended high molecular weight SBR is preferred. In addition, chain end-modified S-SBR and main chain-modified S-SBR which show enhanced interaction with filler may also be used.

The SBR preferably has a styrene content of 19% by mass or more, more preferably 21% by mass or more, still more preferably 25% by mass or more. Also, the styrene content is preferably 60% by mass or less, more preferably 55% by mass or less, still more preferably 50% by mass or less. If the styrene content is less than 19% by mass, the grip performance may not be sufficient. If the styrene content is more than 60% by mass, the styrene groups can easily be located adjacent to each other so that the polymer becomes too hard to produce uniform crosslinking, resulting in deterioration of blowing resistance during high-temperature running.

The styrene content herein is calculated based on $^1$H-NMR analysis.

The SBR preferably has a weight average molecular weight (Mw) of 700,000 or more, more preferably 900,000 or more, still more preferably 1,000,000 or more. The Mw is also preferably 2,000,000 or less, more preferably 1,800,000 or less. The use of a SBR having a Mw of 700,000 or more allows for higher grip performance and abrasion resistance. A Mw of more than 2,000,000 causes difficulties in dispersion of the inorganic filler and in dispersion of the crosslinking components in the polymer, with the result that the occurrence of blowing during high-temperature running tends not to be prevented.

Herein, the weight average molecular weight can be determined by gel permeation chromatography (GPC) (GPC-8000 series available from Tosoh Corporation, detector: differential refractometer, column: TSKGEL SUPER-MALTPORE HZ-M available from Tosoh Corporation) calibrated with polystyrene standards.

The amount of the SBR based on 100% by mass of the diene rubber is preferably 60% by mass or more, more preferably 80% by mass or more. The upper limit of the amount of the SBR is not particularly limited, and may be 100% by mass. With the SBR in the range indicated above, the effect of the present invention can be better achieved.

In particular, the diene rubber preferably includes 60% by mass or more of a SBR having a styrene content of 19% to 60% by mass, and more preferably includes 65% by mass or more of a SBR having a styrene content of 25% to 55% by mass. This allows for higher grip performance and abrasion resistance.

Non-limiting examples of materials that can be included in the diene rubber other than SBR include isoprene rubbers such as natural rubber (NR), highly purified NR (UPNR), epoxidized NR (ENR), and polyisoprene rubber (IR); polybutadiene rubber (BR), styrene-isoprene-butadiene rubber (SIBR), chloroprene rubber (CR), and acrylonitrile butadiene rubber (NBR).

The rubber composition of the present invention contains zinc dithiophosphate. Zinc dithiophosphate is a compound represented by the formula (1) below. The zinc dithiophosphate has a zinc atom at the center of the structure and produces a higher cure accelerating effect than zinc oxide. The use of the dithiophosphate allows even a composition incorporating at least a certain amount of carbon black and softeners with a rubber component including diene rubber to reduce the occurrence of blowing during high-temperature running. The use of zinc dithiophosphate also allows for sufficient crosslinking without using zinc oxide or diphenylguanidine (DPG). Moreover, the use of zinc dithiophosphate greatly improves the temperature dependence of hardness between 23° C. to 100° C. The temperature dependence of hardness is very important from early to late stages of a race in order to ensure stable micro-deformation conformity to the irregularities of the road surface, i.e. road surface grip performance, and high-speed stability.

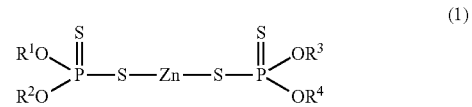

(1)

In the formula, each of $R^1$ to $R^4$ independently represents a C1-C18 linear or branched alkyl group, or a C5-C12 cycloalkyl group.

Examples of the zinc dithiophosphate to be used include TP-50, ZBOP-S, and ZBOP-50 all available from Rhein Chemie, and compounds similar to these products (e.g. compounds of formula (1) in which $R^1$ to $R^4$ are n-propyl, isopropyl, or n-octyl groups).

In the rubber composition of the present invention, the amount of the zinc dithiophosphate (the amount of the active component) per 100 parts by mass of the diene rubber is 0.2 parts by mass or more, preferably 0.5 parts by mass or more, more preferably 1.0 part by mass or more. If the amount is less than 0.2 parts by mass, the effect of preventing the occurrence of blowing during high-temperature running cannot be achieved. Also, the amount is 15 parts by mass or less, preferably 6 parts by mass or less, more preferably 4 parts by mass or less. If the amount is more than 15 parts by mass, the effect of improving blowing resistance tends to be saturated, while scorch time tends to decrease, resulting in deterioration of processability.

In the rubber composition of the present invention, the amount of zinc oxide per 100 parts by mass of the diene rubber is less than 2.5 parts by mass. As described above, zinc dithiophosphate is used in the present invention to achieve uniform crosslinking and thereby reduce the occurrence of blowing during high-temperature running. If zinc oxide is incorporated into rubber, on the other hand, air bubbles can easily accumulate around the zinc oxide particles, so that voids are more likely to be formed. Such a nature is prominent in zinc oxide #2 and zinc oxide #1, which are typical zinc oxide products, and is also observed for finely divided zinc oxide F2 (fine particle grade). Therefore, if zinc oxide is present, unfortunately the voids around the zinc oxide may form nuclei which induce blowing. As the amount of zinc oxide increases, blowing is more likely to occur. The amount of zinc oxide is preferably 2.0 parts by mass or less. More preferably, no zinc oxide is present.

When zinc oxide is incorporated, the zinc oxide is preferably a finely divided zinc oxide having a BET value of 15 m$^2$/g or more because it has higher dispersibility in the rubber component and is less likely to cause voids or nuclei which induce blowing.

The rubber composition of the present invention contains an inorganic filler which includes at least one selected from the group consisting of a compound represented by the formula below, magnesium sulfate, and silicon carbide, and has a BET value of 5 to 120 m$^2$/g and a linseed oil absorption of 30 to 80 mL/100 g. This allows for high wet grip performance and high abrasion resistance.

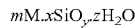

In the formula, M represents at least one metal selected from the group consisting of Al, Mg, Ti, Ca, and Zr, or an oxide or hydroxide of the metal; m represents an integer of 1 to 5; x represents an integer of 0 to 10; y represents an integer of 2 to 5; and z represents an integer of 0 to 10.

Examples of the inorganic filler include alumina, alumina hydrate, aluminum hydroxide, magnesium hydroxide, magnesium oxide, talc, titanium while, titanium black, calcium oxide, calcium hydroxide, magnesium aluminum oxide, clay, pyrophyllite, bentonite, aluminum silicate, magnesium silicate, calcium silicate, calcium aluminum silicate, magnesium silicate, zirconium, zirconium oxide, magnesium sulfate, and silicon carbide (SiC). These inorganic compounds may be used alone, or two or more of these may be used in combination. Preferred among these are inorganic fillers in which M is Al or Zr because they have a Mohs hardness of 3 or more, water resistance, and oil resistance and, when processed into particles of micron size, they produce a scratching effect to improve wet grip performance while providing good abrasion resistance. More preferred is aluminum hydroxide or zirconium oxide because they are abundant resources and low cost. Particularly preferred is aluminum hydroxide as it further provides good kneading productivity and good extrusion processability.

The inorganic filler has a BET value (nitrogen adsorption specific surface area) of 5 to 120 m$^2$/g. If the BET value is out of this range, the effects of improving wet grip performance and abrasion resistance may be insufficient. The lower limit of the BET value is preferably 10 m$^2$/g, while the upper limit of the BET value is preferably 120 m$^2$/g, more preferably 115 m$^2$/g, further preferably 110 m$^2$/g.

The BET value of the inorganic filler is determined by the BET method in accordance with ASTM D3037-81.

The lower limit of the linseed oil absorption of the inorganic filler is 30 mL/100 g, while the upper limit thereof is 80 mL/100 g, preferably 75 mL/100 g. A linseed oil absorption within the range indicated above enables the resulting pneumatic tire to exhibit high wet performance and high dry performance. A smaller linseed oil absorption leads to fewer links (lower structure) between inorganic filler particles so that the inorganic filler particles are more likely to be individually present in the rubber. Accordingly, linseed oil absorption is considered to be used as an effective index for determining whether the individual inorganic filler particles in a nonpolar rubber composition for tires are moderately fine and form aggregates with moderate secondary particle sizes. Specifically, if the linseed oil absorption is less than 30 mL/100 g, it is considered that the compatibility with the rubber component, softeners, and resins decreases so that the location of the inorganic filler in the rubber composition can be thermally unstable. Also, if the linseed oil absorption exceeds 80 mL/100 g, the inorganic filler particles form aggregates with large secondary particle sizes inside of which occlusion portions that will incorporate oil are formed, or which cannot be mixed sufficiently with the rubber component even after the kneading process, thereby causing deterioration of abrasion resistance, elongation properties, or other properties. Moreover, while DBP oil absorption is generally used in this technical field, linseed oil, a natural oil, is also advantageous in that it causes less environmental load than DBP.

For reference, ULTRASIL VN3 (BET value: 175 m$^2$/g) available from Evonik, a typical wet silica in which particle structure easily grows, has a linseed oil absorption of 128 mL/100 g.

The linseed oil absorption is determined in accordance with JIS-K5101-13.

The inorganic filler preferably has an average particle size of 1.5 μm or less, more preferably 0.69 μm or less, still more preferably 0.6 μm or less. The average particle size is also preferably 0.2 μm or more, more preferably 0.25 μm or more, still more preferably 0.4 μm or more. When the average particle size is more than 1.5 μm, abrasion resistance and wet grip performance may decrease. When the average particle size is less than 0.2 μm, abrasion resistance or processability may decrease. The average particle size of the inorganic filler refers to a number average particle size as measured with a transmission electron microscope.

In order to ensure abrasion resistance and wet grip performance of tires and to reduce the metal wear of Banbury mixers or extruders, the inorganic filler preferably has a Mohs hardness of 7 like silica, or less than 7, and more preferably a Mohs hardness of 2 to 5. Mohs hardness, which is one of mechanical properties of materials, is a measure commonly used through the ages in mineral-related fields. Mohs hardness is measured by scratching a material (e.g. aluminum hydroxide) to be analyzed for hardness with a reference material, and checking on the presence of scratches.

In particular, it is preferred to use an inorganic filler which has a Mohs hardness of less than 7 and whose dehydration reaction product has a Mohs hardness of 8 or more. For example, aluminum hydroxide, which has a Mohs hardness of about 3, prevents abrasion (wear) of Banbury mixers or rolls. Further, the upper surface layer of aluminum hydroxide particles undergoes a dehydration reaction (transition) due to vibration or heat build-up during running and partially due to kneading, and thus the aluminum hydroxide is converted to alumina having a Mohs hardness of about 9, which is equal to or higher than the hardness of the stones on the road surface. Therefore, excellent abrasion resistance and excellent wet grip performance can be obtained. It should be noted that the interior of the aluminum hydroxide particles needs not to be entirely converted, and their partial conversion can produce the effect of scratching the road surface. Moreover, aluminum hydroxide and alumina are stable to water, bases, and acids, and neither inhibit curing nor promote oxidative degradation. The inorganic filler after the transition more preferably has a Mohs hardness of 7 or more, without any upper limit. Diamond has the highest hardness of 10.

The inorganic filler preferably has a thermal decomposition onset temperature (DSC endothermic onset temperature) of 160° C. to 500° C., more preferably 170° C. to 400° C. When the temperature is less than 160° C., thermal decomposition or reaggregation may excessively proceed during kneading, and the metal of the kneader rotor blades, the container wall, or the like may be excessively worn. The thermal decomposition onset temperature of the inorganic filler is determined by differential scanning calorimetry (DSC). The term "thermal decomposition" includes dehydration reactions.

The inorganic filler may be a commercial product that has the above-described BET value and linseed oil absorption, and may also be, for example, an inorganic filler having been processed into particles with the above properties by grinding or other treatments. The grinding treatment may be carried out by conventional methods, such as wet grinding or dry grinding using, for example, a jet mill, a current jet mill, a counter jet mill, or a contraplex mill.

If necessary, particles having the predetermined BET value may be prepared by fractionation by a membrane filtering method often employed in medical fields or biofields, before use as a compounding agent for rubber.

The amount of the inorganic filler per 100 parts by mass of the diene rubber is 1 part by mass or more, preferably 3 parts by mass or more, more preferably 5 parts by mass or more. If the amount is less than 1 part by mass, sufficient wet grip performance may not be obtained. Also, the amount is 70 parts by mass or less, preferably 65 parts by mass or less, more preferably 60 parts by mass or less. If the amount is more than 70 parts by mass, abrasion resistance or abrasion appearance after abrasion may deteriorate to an extent that cannot be compensated by controlling other compounding agents, and tensile strength and the like may also deteriorate.

The rubber composition of the present invention contains sulfur. Examples of the sulfur include sulfurs commonly used in the rubber industry, such as sulfur powder, precipitated sulfur, colloidal sulfur, insoluble sulfur, highly dispersible sulfur, and soluble sulfur.

In the rubber composition of the present invention, the amount of the sulfur per 100 parts by mass of the diene rubber is preferably 0.2 parts by mass or more, more preferably 0.5 parts by mass or more, still more preferably 0.6 parts by mass or more. The amount of the sulfur is also preferably 2.0 parts by mass or less, more preferably 1.8 parts by mass or less, still more preferably 1.6 parts by mass or less. If the amount is less than 0.2 parts by mass, the hardness (Hs) after vulcanization or co-curing with adjacent rubber compounds may not be sufficient. If the amount is more than 2.0 parts by mass, abrasion resistance may deteriorate. It should be noted that the amount of the sulfur means the net sulfur content introduced in the final kneading process. For example, in the case of insoluble sulfur containing oil, the amount of the sulfur means the net sulfur content excluding oil.

The rubber composition of the present invention preferably contains carbon black. The incorporation of carbon black improves abrasion resistance and grip performance.

The carbon black preferably has a nitrogen adsorption specific surface area (BET value) of 110 $m^2/g$ or more, more preferably 140 $m^2/g$ or more, still more preferably 151 $m^2/g$ or more. The BET value is also preferably 300 $m^2/g$ or less, more preferably 250 $m^2/g$ or less, still more preferably 200 $m^2/g$ or less. In particular, the incorporation of a carbon black having a BET value of 151 $m^2/g$ or more can provide particularly high abrasion resistance and grip performance.

The BET value of the carbon black is determined in accordance with JIS K 6217-2:2001.

The amount of the carbon black per 100 parts by mass of the diene rubber is preferably 5 parts by mass or more, more preferably 20 parts by mass or more. If the amount is less than 5 parts by mass, the effects of improving abrasion resistance and grip performance may not be sufficient. The amount is also preferably 130 parts by mass or less, more preferably 120 parts by mass or less. If the amount is more than 130 parts by mass, tensile properties may decrease.

The rubber composition of the present invention may contain silica. The incorporation of silica can improve rolling resistance properties while enhancing wet grip performance and reinforcing properties.

Examples of the silica include wet-process silica and dry-process silica.

The silica preferably has a nitrogen adsorption specific surface area (BET value) of 80 $m^2/g$ or more, more preferably 120 $m^2/g$ or more, still more preferably 150 $m^2/g$ or more. The BET value is also preferably 280 $m^2/g$ or less, more preferably 260 $m^2/g$ or less, still more preferably 250 $m^2/g$ or less.

The BET value of the silica is determined by the BET method in accordance with ASTM D3037-93.

In cases where wet grip performance is more emphasized than dry grip performance, the amount of the silica per 100 parts by mass of the diene rubber is preferably 30 parts by mass or more, more preferably 40 parts by mass or more, still more preferably 50 parts by mass or more. If the amount is less than 30 parts by mass, the reinforcing properties may not be sufficient. The amount is also preferably 150 parts by mass or less, more preferably 130 parts by mass or less, still more preferably 120 parts by mass or less. If the amount is more than 150 parts by mass, the silica is less likely to disperse, which tends to result in deterioration of abrasion resistance or tensile properties.

When the rubber composition of the present invention contains the silica, the rubber composition preferably further contains a silane coupling agent. The silane coupling agent may be any silane coupling agent conventionally used in combination with silica in the rubber industry.

When alkoxysilane polysulfides are used as the silane coupling agent, however, the amount of alkoxysilane polysulfides per 100 parts by mass of the diene rubber is preferably 1.0 part by mass or less.

Alkoxysilane polysulfides, which have weak sulfur-sulfur bonds ($S_x$) in the structure, are more likely to cause rubber scorch due to scission of the bonds during kneading. Moreover, since the bond between the silica and the silanes is also weak, the bond breaks during kneading or storage after kneading, causing a reduction in elongation at break or fuel economy. Even when alkoxysilane polysulfides are used as the silane coupling agent, their effect can be minimized by adjusting their amount to 1.0 part by mass or less.

The rubber composition of the present invention preferably contains at least one softener selected from the group consisting of low temperature plasticizers, process oils, and resins having a softening point of 160° C. or lower. The incorporation of the softener allows the resulting pneumatic tire to have more improved grip performance. In the present invention, by incorporating zinc dithiophosphate while adjusting the zinc oxide content to below a certain level, even a high softener content composition incorporating at least a certain amount of softeners can effectively prevent the occurrence of blowing during dry running.

The low temperature plasticizer preferably has a freezing point of −15° C. or lower. The low temperature plasticizer having such a low freezing point serves to reduce the compound Tg or brittle temperature of the rubber composition due to its chemical composition as well. The freezing point refers to the temperature at which a liquid is solidified by cooling, as set forth in JIS-K2269. The glass transition temperature (Tg) refers to a temperature as measured with a differential scanning calorimeter (DSC) in accordance with ASTM D3418-03.

In order to ensure compatibility between the low temperature plasticizer and the diene rubber, the low temperature plasticizer preferably has a SP value of 8 to 9. The SP value refers to a solubility parameter calculated from Hansen's equation. Also, in order to enhance the compatibility, the low temperature plasticizer preferably contains an ethylhexyl group or a phenyl group because such a low temperature plasticizer is structurally similar particularly to SBR and NR.

It should be noted that the term "low temperature plasticizer" does not include process oils and resins described later.

Since the low temperature plasticizer can ignite when introduced into a Banbury mixer, the low temperature plasticizer preferably has a flash point of 200° C. or higher. For example, in the case where the discharge temperature in kneading is set at 180° C., the maximum temperature of the rubber composition locally reaches up to 195° C. The use of the low temperature plasticizer having a flash point of 200° C. or higher can reduce the risk of ignition.

In the present invention, the flash point of the low temperature plasticizer is measured by the Cleveland open cup method in accordance with JIS K 2265-4:2007.

The above-described low temperature plasticizers are conventionally widely used for vinyl chloride, celluloses, resin plastics, various rubbers, and other materials. In the rubber composition of the present invention, the low temperature plasticizer preferably has a weight average molecular weight (Mw) of 400 or more in order to prevent its migration to adjacent components and to increase the flash point.

Examples of the low temperature plasticizer include tris (2-ethylhexyl)phosphate (TOP, freezing point: −70° C. or lower, flash point: 204° C., SP value: 8.1, Mw: 435), bis(2-ethylhexyl)sebacate (DOS, freezing point: −62° C., flash point: 222° C., SP value: 8.4, Mw: 427), bis(2-ethylhexyl) phthalate (DOP, freezing point: −51° C., flash point: 218° C., SP value: 8.9, Mw: 391), and bis[2-(2-butoxyethoxyethyl)-ethyl]adipate (BXA-N, freezing point: −19° C., flash point: 207° C., SP value: 8.7, Mw: 435). Suitable among these is TOP or BXA-N because they have higher compatibility with the rubber component, a flash point of 200° C. or higher, and a weight average molecular weight as high as 400 or more.

Examples of the process oil include paraffinic process oils, naphthenic process oils, and aromatic process oils. Other examples include process oils having a low polycyclic aromatic (PCA) compound content from an environmental standpoint. Examples of the low PCA content process oil include treated distillate aromatic extracts (TDAE) prepared by re-extraction of oil aromatic process oils, an alternative to aromatic oils which is a mixture of asphalt and naphthene oil, mild extraction solvates (MES), and heavy naphthenic oils.

When the rubber composition of the present invention contains a process oil, the amount of the process oil per 100 parts by mass of the diene rubber is preferably 2 parts by mass or more, more preferably 5 parts by mass or more. The amount is also preferably 100 parts by mass or less, more preferably 70 parts by mass or less, still more preferably 60 parts by mass or less. With the process oil in the range indicated above, the effect of the present invention can be better achieved.

It should be noted that in cases where the diene rubber includes an oil extended diene rubber, the total amount of the softener includes the amount of the process oil contained in the oil extended diene rubber.

Examples of the resin having a softening point of 160° C. or lower include coumarone-indene resins, α-methylstyrene resins, terpene resins, and alkylphenol resins.

The resin preferably has a softening point of −20° C. or higher, more preferably 0° C. or higher, still more preferably 40° C. or higher, particularly preferably 70° C. or higher. Also, the softening point is preferably 160° C. or lower, more preferably 150° C. or lower.

Herein, the softening point is determined as set forth in JIS K 6220-1:2001 with a ring and ball softening point measuring apparatus and is defined as the temperature at which the ball drops down.

The coumarone-indene resin refers to a resin containing coumarone and indene as monomers forming the skeleton (main chain) of the resin. Examples of monomers that can be contained in the skeleton other than coumarone and indene include styrene, α-methylstyrene, methylindene, and vinyltoluene.

The coumarone-indene resin preferably has a softening point of −20° C. to 160° C. The upper limit of the softening point is more preferably 145° C. or lower, still more preferably 130° C. or lower. The lower limit thereof is more preferably −10° C. or higher, still more preferably −5° C. or higher. If the softening point is higher than 160° C., the dispersibility during kneading tends to deteriorate, resulting in poor fuel economy. The coumarone-indene resin having a softening point of lower than −20° C. is difficult to produce, and it is also more likely to migrate to other components and to volatilize, which may result in changes in its properties during use.

When the coumarone-indene resin used has a softening point of 90° C. to 140° C., dry grip performance is improved. Especially, the coumarone-indene resin having a softening point of 100° C. to 120° C. can overall increase the tan δ over a range of 0° C. to 80° C., and also provides good elongation at break.

The coumarone-indene resin having a softening point of 10° C. to 30° C. provides good grip performance at relatively low temperatures between 10° C. to 40° C., and overall reduces the tan δ. Such a coumarone-indene resin having a softening point of 10° C. to 30° C. may be used mainly to improve elongation at break.

The reason why elongation at break is improved by the use of the coumarone-indene resin is probably that the coumarone-indene resin imparts moderate sliding properties to the crosslinked polymer chains, allowing for their uniform elongation.

Examples of the α-methylstyrene resin include α-methylstyrene homopolymer and α-methylstyrene-styrene copolymers.

The α-methylstyrene resin preferably has a softening point of −20° C. to 160° C. The upper limit of the softening point is more preferably 145° C. or lower, still more preferably 130° C. or lower. The lower limit thereof is more preferably −10° C. or higher, still more preferably −5° C. or higher. If the softening point is higher than 160° C., the dispersibility during kneading tends to deteriorate, resulting in poor fuel economy. The α-methylstyrene resin having a softening point of lower than −20° C. is difficult to produce, and it is also more likely to migrate to other components and to volatilize, which may result in changes in its properties during production or use.

Examples of the terpene resin include polyterpenes, terpene phenolics, aromatic modified terpene resins, and resins obtained by hydrogenation of the foregoing.

The polyterpene refers to a resin obtained by polymerization of a terpene compound. The "terpene compound" includes hydrocarbons represented by the compositional formula $(C_5H_8)_n$ and their oxygen-containing derivatives, each of which has a terpene basic skeleton, classified into monoterpenes $(C_{10}H_{16})$, sesquiterpenes $(C_{15}H_{24})$, diterpenes $(C_{20}H_{32})$, and other terpenes. Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene include terpene resins formed from the terpene compounds described above, such as α-pinene resin, β-pinene resin, limonene resin, dipentene resin, and β-pinene/limonene resin.

Examples of the terpene phenolic include resins obtained by copolymerization of the above terpene compounds with phenolic compounds. Specific examples include resins obtained by condensation of the terpene compounds, phenolic compounds, and formalin. Examples of the phenolic compound include phenol, bisphenol A, cresol, and xylenol.

Examples of the aromatic modified terpene resin include resins obtained by polymerization of the above terpene compounds and aromatic compounds (excluding the phenolic compounds described above). Examples of the aromatic compound include petroleum-derived aromatic compounds having modifying groups attached thereto, such as specifically styrene, α-methylstyrene, vinyltoluene, isopropenyltoluene, divinyltoluene, and 2-phenyl-2-butene.

The terpene resin preferably has a softening point of 70° C. to 150° C. The lower limit of the softening point is more preferably 80° C. or higher. If the softening point is lower than 70° C., the high-temperature grip performance or stiffness may not be sufficient. The upper limit of the softening point is also more preferably 145° C. or lower. If the softening point is higher than 150° C., initial grip performance tends to deteriorate.

Non-limiting examples of the alkylphenol resin include alkylphenol-aldehyde condensation resins obtained by reaction of alkylphenols with aldehydes such as formaldehyde, acetaldehyde, or furfural in the presence of acid or alkali catalysts; alkylphenol-alkyne condensation resins obtained by reaction of alkylphenols with alkynes such as acetylene; and modified alkylphenol resins obtained by modification of the foregoing resins with compounds such as cashew oil, tall oil, linseed oil, various animal or vegetable oils, unsaturated fatty acids, rosin, alkylbenzene resins, aniline, or melamine. In view of the effect of the present invention, alkylphenol-alkyne condensation resins are preferred among these, with alkylphenol-acetylene condensation resins being particularly preferred.

Examples of the alkylphenol of the alkylphenol resin include cresol, xylenol, t-butylphenol, octylphenol, and nonylphenol. Among these, phenols containing branched alkyl groups such as t-butylphenol are preferred, with t-butylphenol being particularly preferred.

The alkylphenol resin preferably has a softening point of 100° C. to 160° C. More preferably, the upper limit of the softening point is 150° C. or lower, while the lower limit is 120° C. or higher.

The alkylphenol resin having a softening point of 120° C. to 160° C. (e.g. Koresin having a softening point of 145° C.) improves grip performance particularly at high temperatures (about 80-120° C.). The combined use of the alkylphenol resin with an α-methylstyrene resin having a softening point of about 85° C. (which has excellent grip performance at low temperatures (10-40° C.)) can improve grip performance at tire running temperatures between 20° C. and 120° C.

In order to better achieve the effect of the present invention, the resin is preferably at least one selected from the group consisting of coumarone-indene resins, α-methylstyrene resins, terpene resins, and alkylphenol resins.

When the rubber composition of the present invention contains the resin described above, the amount of the resin per 100 parts by mass of the diene rubber is preferably 1 part by mass or more, more preferably 3 parts by mass or more. The amount is also preferably 100 parts by mass or less, more preferably 70 parts by mass or less. With the resin in the range indicated above, the effect of the present invention can be better achieved.

In order to better achieve the effect of the present invention, the rubber composition of the present invention preferably contains a process oil and/or a resin having a softening point of 160° C. or lower, and more preferably contains a process oil and a resin having a softening point of 160° C. or lower.

The total amount of the at least one softener selected from the group consisting of low temperature plasticizers, process oils, and resins having a softening point of 160° C. or lower is 40 parts by mass or more, preferably 45 parts by mass or more, more preferably 50 parts by mass or more per 100 parts by mass of the diene rubber. The total amount is also preferably 150 parts by mass or less, more preferably 145 parts by mass or less, still more preferably 140 parts by mass or less. A softener content of 40 parts by mass or more can lead to the production of a pneumatic tire having extremely high grip performance. If the softener content is more than 150 parts by mass, the modulus M300 tends to decrease so that blowing can easily occur during high-temperature running.

It should be noted that in cases where the diene rubber includes an oil extended diene rubber, the total amount of the softener includes the amount of the process oil contained in the oil extended diene rubber.

The rubber composition of the present invention preferably contains a vulcanization accelerator and stearic acid. The combined use of zinc dithiophosphate, stearic acid, and a vulcanization accelerator can further accelerate the curing reaction, resulting in more uniform crosslinking with more proper crosslink density. Stearic acid is known to have an effect of dispersing zinc oxide in rubber. The same effect has been found for zinc dithiophosphate.

Examples of the vulcanization accelerator include thiazole vulcanization accelerators, thiuram vulcanization accelerators, guanidine vulcanization accelerators, and dithiocarbamate vulcanization accelerators.

In particular, the combined use of zinc dithiophosphate with stearic acid and a thiazole vulcanization accelerator (particularly TBBS) can produce a higher curing reaction accelerating effect. Further, a particularly high curing reaction accelerating effect can be produced by the combined use of zinc dithiophosphate with stearic acid, a thiazole vulcanization accelerator (particularly TBBS), and a thiuram vulcanization accelerator (particularly TBzTD) and/or a dithiocarbamate vulcanization accelerator (particularly ZTC, PX).

Examples of the thiazole vulcanization accelerator (benzothiazole group-containing vulcanization accelerator) include sulfenamide vulcanization accelerators such as N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS); and benzothiazole vulcanization accelerators such as 2-mercaptobenzothiazole, cyclohexylamine salts of 2-mercaptobenzothiazole, and di-2-benzothiazolyl disulfide. Preferred among these are sulfenamide vulcanization accelerators, with TBBS being more preferred. Examples of the thiuram vulcanization accelerator include tetramethylthiuram disulfide (TMTD), tetrabenzylthiuram disulfide (TBzTD), and tetrakis(2-ethylhexyl)thiuram disulfide (TOT-N). Preferred among these is TBzTD. Examples of the guanidine vulcanization accelerator include diphenylguanidine (DPG), diorthotolylguanidine, and orthotolylbiguanidine. Examples of the dithiocarbamate vulcanization accelerator include zinc dibenzyldithiocarbamate (ZTC) and zinc ethylphenyldithiocarbamate (PX). Among these, ZTC or PX is preferred.

However, among vulcanization accelerators, the use of DPG, which exhibits a carcinogenic effect in animal experiments as pointed out by a research institute, needs to be reduced. Another disadvantage of DPG is that it easily adsorbs silica or silane and thereby inhibits the bonding between the silica and silane, leading to deterioration of rubber physical properties. In the present invention, a favorable cure rate can be ensured by the use of zinc dithiophosphate without using DPG. Therefore, in the rubber composition of the present invention, the amount of DPG is preferably 0.5 parts by mass or less, more preferably 0.2 parts by mass or less, still more preferably 0.1 parts by mass or less, particularly preferably 0 parts by mass (no DPG).

In the rubber composition of the present invention, the amount of the vulcanization accelerator (excluding DPG) per 100 parts by mass of the diene rubber is preferably 2 parts by mass or more, more preferably 3 parts by mass or more, still more preferably 4 parts by mass or more. The amount of the vulcanization accelerator is also preferably 15 parts by mass or less, more preferably 12 parts by mass or less, still more preferably 10 parts by mass or less. A vulcanization accelerator content of 2 parts by mass or more can lead to more uniform crosslinking with more proper crosslink density due to the synergistic effect with zinc dithiophosphate and stearic acid. As a result, the occurrence of blowing during high-speed running can be reduced. If the amount of the vulcanization accelerator is more than 15 parts by mass, the vulcanization accelerator may be poorly dispersed, resulting in a reduction in blowing resistance or elongation at break.

In the rubber composition of the present invention, the amount of the stearic acid per 100 parts by mass of the diene rubber is preferably 1.0 part by mass or more, more preferably 1.5 parts by mass or more. The amount of the stearic acid is also preferably 5.0 parts by mass or less, more preferably 4.0 parts by mass or less. A stearic acid content within the range indicated above allows for uniform crosslinking with proper crosslink density. It should be noted that the preferred range of the amount of the stearic acid may vary depending on the amount of fatty acids contained in the diene rubber, processing aid, mold release agent, and other components.

The rubber composition of the present invention may appropriately incorporate, in addition to the above-described components, compounding agents commonly used in the tire industry, such as wax, antioxidants, mold release agents, and other materials.

The rubber composition of the present invention can be prepared by known methods which involve kneading steps such as base kneading and final kneading steps. The kneading steps may be carried out by kneading the above components using a kneading machine, for example. The kneading machine may be a conventional one, e.g. a Banbury mixer, a kneader, or an open roll mill.

In the step of kneading at least the rubber component, carbon black, silica, silane coupling agent, and inorganic filler (e.g., which corresponds to a base kneading step if the base kneading step is carried out in a single step, or the step of introducing the inorganic filler and kneading it with the rubber component if the base kneading step is divided into a series of steps as described later), for example, in the base kneading step, the discharge temperature is 150° C. or higher, preferably 155° C. or higher, more preferably 160° C. or higher, still more preferably 165° C. or higher, particularly preferably 170° C. or higher, while the upper limit of the discharge temperature is not particularly limited, but in order to obtain the desired properties, the discharge temperature may be adjusted as appropriate as long as it does not cause rubber scorch. The discharge temperature is preferably 190° C. or lower, more preferably 185° C. or lower.

The base kneading step may be divided into a series of steps for high filler content compounds with relatively small amount of softeners. For example, the base kneading step may be a single step in which the rubber component, inorganic filler, and other components are kneaded, or alternatively may be divided into a series of steps such as: X-kneading in which the rubber component, carbon black, 2/3 silica, and 2/3 silane coupling agent are kneaded; Y-kneading in which the kneaded mixture obtained by X-kneading, the remaining silica, the remaining silane coupling agent, and the other components, excluding sulfur and vulcanization accelerators, are kneaded; and Z-kneading in which the kneaded mixture obtained by Y-kneading is re-kneaded. In this case, the inorganic filler is preferably introduced in X-kneading in which a higher kneading torque can be generated.

In the usual production methods, vulcanizing agents are introduced in final kneading. However, zinc dithiophosphate is preferably introduced in base kneading in order to enhance its dispersibility in the rubber component to produce more uniform crosslinking.

However, in the case where the zinc dithiophosphate is used in the form of a masterbatch, such as TP-50 available from Rhein Chemie, and combined with a dispersion aid, substantially the same physical properties as obtained when the zinc dithiophosphate is introduced in base kneading can be obtained even when it is introduced in final kneading.

After the base kneading step, for example, a final kneading step may be performed in which the resulting kneaded mixture 1 is kneaded with vulcanizing agents (e.g. sulfur), vulcanization accelerators and the like using a kneading machine as described above (at a discharge temperature of for example 80° C. to 110° C.), followed by a vulcanization step in which the resulting kneaded mixture 2 (unvulcanized rubber composition) is heat pressed at 150° C. to 170° C. for 10 to 30 minutes, whereby a rubber composition of the present invention can be prepared.

The rubber composition of the present invention is used for treads of pneumatic tires. In particular, the rubber composition can be suitably used in cap treads which form outer surface layers of multi-layered treads. For example, the rubber composition is suitable for an outer surface layer (cap tread) of a tread having a two layer structure consisting of the outer surface layer and an inner surface layer (base tread).

The pneumatic tire of the present invention can be produced from the rubber composition by usual methods. Specifically, the pneumatic tire may be produced as follows: an unvulcanized rubber composition incorporating various additives as appropriate is extruded into the shape of a tire tread, formed on a tire building machine, and assembled with other tire components to build an unvulcanized tire; and the unvulcanized tire is heated and pressurized in a vulcanizer.

The pneumatic tire of the present invention is suitable for passenger vehicles, large passenger vehicles, large SUVs, heavy duty vehicles such as trucks and buses, and light trucks. The pneumatic tire can be used as any of the summer tires or studless winter tires for these vehicles.

The pneumatic tire of the present invention in which the occurrence of blowing can be reduced even during high-temperature running is also suitable as a racing tire.

EXAMPLES

The present invention is more specifically described with reference to non-limiting examples.

The chemicals used in the examples and comparative examples are listed below.

<Rubber Component (SBR)>
Modified SBR 1: Product prepared as described below (oil extender: 37.5 parts, styrene content: 41%, vinyl content: 40%, Tg: −29° C., weight average molecular weight: 1,190,000)
Silica-modified SBR 2: Product prepared as described below (styrene content: 27% by mass, vinyl content: 58% by mass, Tg: −27° C., weight average molecular weight: 720,000)
NS612: Product available from Zeon Corporation (non-oil extended, styrene content: 15%, vinyl content: 30%, Tg: −65° C., weight average molecular weight: 780,000)
<Method for Preparation of Modified SBR 1>
(1) Preparation of Chain End Modifier
A 250 mL measuring flask was charged with 20.8 g of 3-(N,N-dimethylamino)propyltrimethoxysilane (available from AZmax. Co.) in a nitrogen atmosphere, and then anhydrous hexane (available from Kanto Chemical Co., Inc.) was added to give a total volume of 250 mL of a chain end modifier.
(2) Preparation of Modified SBR 1
A sufficiently nitrogen-purged 30 L pressure-resistant vessel was charged with 18 L of n-hexane, 800 g of styrene (available from Kanto Chemical Co., Inc.), 1,200 g of butadiene, and 1.1 mmol of tetramethylethylenediamine, and then the temperature was raised to 40° C. Next, 1.8 mL of 1.6 M butyllithium (available from Kanto Chemical Co., Inc.) was added to the mixture, and then the temperature was raised to 50° C., followed by stirring for three hours. Subsequently, 4.1 mL of the chain end modifier was added to the resulting mixture, followed by stirring for 30 minutes. After 15 mL of methanol and 0.1 g of 2,6-tert-butyl-p-cresol (available from Ouchi Shinko Chemical Industrial Co., Ltd.) were added to the reaction solution, 1,200 g of TDAE was added followed by stirring for 10 minutes. Thereafter, aggregates were collected from the polymer solution by steam stripping. The aggregates were dried under reduced pressure for 24 hours to obtain modified SBR 1.

<Method for Preparation of Silica-Modified SBR 2>
A sufficiently nitrogen-purged, 30 L pressure-resistant vessel was charged with 18 L of n-hexane, 740 g of styrene (available from Kanto Chemical Co., Inc.), 1,260 g of butadiene, and 10 mmol of tetramethylethylenediamine, and then the temperature was raised to 40° C. Next, 10 mL of butyllithium was added to the mixture, and then the temperature was raised to 50° C., followed by stirring for three hours. Subsequently, 11 mL of the chain end modifier was added to the resulting mixture, followed by stirring for 30 minutes. After 15 mL of methanol and 0.1 g of 2,6-tert-butyl-p-cresol were added to the reaction solution, the reaction solution was placed in a stainless steel vessel containing 18 L of methanol to collect aggregates. The aggregates were dried under reduced pressure for 24 hours to obtain silica-modified SBR 2.

<Rubber Component (BR)>
CB24: High-cis BR synthesized using a Nd catalyst, available from LANXESS <Carbon Black>
EB201: Pilot product available from Orion Engineering (former Evonik) (BET value: estimated 240 m$^2$/g)
HP180: Product available from Orion Engineered Carbons (BET value: 175 m$^2$/g)
HP160: Product available from Orion Engineered Carbons (BET value: 153 m$^2$/g)
N110: SHOBLACK N110 available from Cabot Japan K.K. (BET value: 142 m$^2$/g)

<Silica>
VN3: ULTRASIL VN3 available from Evonik (BET value: 175 m$^2$/g, linseed oil absorption: 128 mL/100 g)

<Aluminum Hydroxide (Inorganic Filler)>
Wet synthesis type (1): Wet synthesis product available from Toda Kogyo Corp. (BET value: 82 m$^2$/g, linseed oil absorption: 82 mL/100 g)
Wet synthesis type (2): Wet synthesis product available from Toda Kogyo Corp. (BET value: 102 m$^2$/g, linseed oil absorption: 88 mL/100 g)
Wet synthesis type (3): Wet synthesis product available from Toda Kogyo Corp. (BET value: 274 m$^2$/g, linseed oil absorption: 104 mL/100 g)
Ground type (1): Dry ground product of ATH#B available from Sumitomo Chemical Co., Ltd. (BET value: 35 m$^2$/g, linseed oil absorption: 37 mL/100 g)
Ground type (2): Dry ground product of ATH#B available from Sumitomo Chemical Co., Ltd. (BET value: 75 m$^2$/g, linseed oil absorption: 42 mL/100 g)
Ground type (3): Dry ground product of ATH#B available from Sumitomo Chemical Co., Ltd. (BET value: 95 m$^2$/g, linseed oil absorption: 38 mL/100 g)
Ground type (4): Dry ground product of ATH#B available from Sumitomo Chemical Co., Ltd. (BET value: 125 m$^2$/g, linseed oil absorption: 55 mL/100 g)
ATH#B: Product available from Sumitomo Chemical Co., Ltd. (BET value: 14 m$^2$/g, linseed oil absorption: 40 mL/100 g)

Higi H43: Product available from Showa Denko K.K. (BET value: 7 m$^2$/g, linseed oil absorption: 33 mL/100 g)

C-301N: Product available from Sumitomo Chemical Co., Ltd. (BET value: 4 m$^2$/g, linseed oil absorption: 27 mL/100 g)

<Process Oil>

TDAE oil: Vivatec 500 available from H&R

<Resin>

C120: Liquid coumarone-indene resin available from Rutgers Chemicals (softening point: 120° C., Tg: 65° C.)

SA85: α-Methylstyrene resin Sylvares SA85 available from Arizona Chemical (softening point: 85° C., Tg: 43° C.)

Koresin: Koresin available from BASF (p-t-butylphenol-acetylene resin, softening point: 145° C., Tg: 98° C.)

TO125: YS resin TO125 available from Yasuhara Chemical Co., Ltd. (aromatic modified terpene resin, softening point: 125° C.)

<Zinc Oxide>

F2: Zincox Super F2 available from Hakusui Tech Co., Ltd. (BET value: 20 m$^2$/g, primary particle size calculated from BET value: 65 μm)

Ginrei R: Ginrei R available from Toho Zinc Co., Ltd. (BET value: 5 m$^2$/g)

<Coupling Agent>

Si75: Silane coupling agent available from Evonik

NXT: Silane coupling agent (($C_2H_5O)_3Si$—$C_3H_6$—S—CO—$C_7H_{15}$) available from Momentive Performance Materials Inc.

<Antioxidant>

6PPD: Antigene 6C (N-(1,3-dimethylbutyl)-N'-phenyl-p-phenylenediamine) available from Sumitomo Chemical Co., Ltd.

TMQ: Nocrac 224 (2,2,4-trimethyl-1,2-dihydroquinoline polymer) available from Ouchi Shinko Chemical Industrial Co., Ltd.

<Vulcanizing Agent>

TP-50: Zinc dithiophosphate, TP-50 available from Rhein Chemie (formula (1) where $R^1$ to $R^4$ are n-butyl groups, active component: 50% by mass)

ZBOP-50: Zinc dithiophosphate, ZBOP-50 available from Rhein Chemie (formula (1) where $R^1$ to $R^4$ are alkyl groups, active component: 50% by mass)

Stearic acid: Stearic acid "Tsubaki" available from NOF Corporation

5% oil-containing sulfur powder: HK-200-5 available from Hosoi Chemical Industry Co., Ltd.

<Vulcanization Accelerator>

TBBS: Nocceler NS-G (N-tert-butyl-2-benzothiazolyl-sulfeneamide) available from Ouchi Shinko Chemical Industrial Co., Ltd.

DPG: Nocceler D (N,N-diphenylguanidine) available from Ouchi Shinko Chemical Industrial Co., Ltd.

TBZTD: Perkacit TBZTD (tetrabenzylthiuram disulfide) available from Flexsys

Examples and Comparative Examples

According to the formulations and kneading conditions shown in Tables 1 to 3, kneading was performed using a 4 L Banbury mixer.

For the compositions shown in Tables 1 and 2, kneading was performed three times: X-kneading, Y-kneading, and final kneading. In the X-kneading, the rubber component, the whole amount of carbon black, the whole amount of inorganic filler (aluminum hydroxide), two-thirds of the amount of silica, two-thirds of the amount of coupling agent were introduced and then kneaded for five minutes at a discharge temperature of 155° C. In the Y-kneading, the remaining chemicals, excluding the sulfur and vulcanization accelerators, were introduced and then kneaded for four minutes at a discharge temperature of 155° C. In the final kneading, the sulfur and vulcanization accelerators were added to the resulting kneaded mixture and they were kneaded for three minutes with an open roll mill to obtain an unvulcanized rubber composition. The maximum rubber temperature in this step was 100° C.

For the compositions shown in Table 3, kneading was performed two times: X-kneading and final kneading. In the X-kneading, the chemicals other than the sulfur and vulcanization accelerators were introduced and then kneaded for five minutes at a discharge temperature of 155° C. In the final kneading, the sulfur and vulcanization accelerators were added to the kneaded mixture and they were kneaded for three minutes with an open roll mill to obtain an unvulcanized rubber composition. The maximum rubber temperature in this step was 100° C.

Zinc dithiophosphate was introduced in base kneading.

The unvulcanized rubber composition was heat pressed at 170° C. for 12 minutes to obtain a vulcanized rubber composition.

Separately, the unvulcanized rubber composition prepared as above was formed into a tread shape and assembled with other tire components on a tire building machine, followed by press vulcanization at 170° C. for 12 minutes to obtain a test tire (tire size: 245/40R18).

The unvulcanized rubber compositions and test tires prepared as above were evaluated as follows. Tables 1 to 3 show the results.

(Blowing Resistance)

The test tires were mounted on a front-engine, rear-wheel-drive car of 2000 cc displacement made in Japan and then subjected to a 500 km long run in an OKAYAMA International Circuit track in which the road surface was dry and had a temperature of 20° C. to 30° C.

After the run, the appearance of the cross section of the tires was observed for degree of formation of honeycomb pores at a position about 1 mm above the JLB cord in the tread to evaluate blowing resistance.

The degrees of formation of honeycomb pores are expressed as an index, with Comparative Example 1 set equal to 100. A higher index indicates better blowing resistance. The blowing resistance target is 120 or higher.

(Wet Grip Performance)

The test tires were mounted on a front-engine, rear-wheel-drive car of 2000 cc displacement made in Japan. A test driver drove the car 10 laps around a test track under wet asphalt road conditions and then evaluated the stability of steering control. The results are expressed as an index, with Comparative Example 1 set equal to 100. A higher index indicates better wet grip performance. The wet grip performance target is 105 or higher.

(Abrasion Resistance)

The test tires were mounted on a front-engine, rear-wheel-drive car of 2000 cc displacement made in Japan. A driver drove the car in a test track under dry asphalt road conditions. Then, the remaining groove depth in the tire tread rubber (initial depth: 8.0 mm) was measured to evaluate abrasion resistance. A larger average depth of remaining main grooves indicates better abrasion resistance. The remaining groove depths are expressed as an index, with Comparative Example 1 set equal to 100. A higher index indicates better abrasion resistance. The abrasion resistance target is 105 or higher.

TABLE 1

| | | Ex. 1 | Com. Ex. 1 | Com. Ex. 2 | Com. Ex. 3 | Com. Ex. 4 | Com. Ex. 5 | Com. Ex. 6 | Ex. 2 | Ex. 3 | Ex. 4 | Ex. 5 | Com. Ex. 7 | Ex. 6 | Ex. 7 | Ex. 8 | Ex. 9 |
|---|---|---|---|---|---|---|---|---|---|---|---|---|---|---|---|---|---|
| Rubber component | SBR Modified SBR 1 | 137.5 | 137.5 | 137.5 | 137.5 | 137.5 | 137.5 | 137.5 | 137.5 | 137.5 | 137.5 | 137.5 | 137.5 | 137.5 | 137.5 | 137.5 | 137.5 |
| | Silica-modified SBR 2 | 0 | 0 | 0 | 0 | 0 | 0 | 0 | 0 | 0 | 0 | 0 | 0 | 0 | 0 | 0 | 0 |
| | BR NS612 | 0 | 0 | 0 | 0 | 0 | 0 | 0 | 0 | 0 | 0 | 0 | 0 | 0 | 0 | 0 | 0 |
| | CB24 | 0 | 0 | 0 | 0 | 0 | 0 | 0 | 0 | 0 | 0 | 0 | 0 | 0 | 0 | 0 | 0 |
| Carbon black or silica | EB201 | 0 | 0 | 0 | 0 | 0 | 0 | 0 | 0 | 0 | 0 | 0 | 0 | 0 | 0 | 0 | 0 |
| | HP180 | 25 | 25 | 25 | 25 | 25 | 25 | 25 | 25 | 25 | 25 | 25 | 25 | 25 | 25 | 25 | 25 |
| | HP160 | 0 | 0 | 0 | 0 | 0 | 0 | 0 | 0 | 0 | 0 | 0 | 0 | 0 | 40 | 0 | 0 |
| | N110 | 0 | 0 | 0 | 0 | 0 | 0 | 0 | 0 | 0 | 0 | 0 | 0 | 5 | 0 | 0 | 0 |
| | VN3 | 80 | 80 | 80 | 80 | 80 | 80 | 80 | 80 | 80 | 80 | 80 | 80 | 85 | 65 | 60 | 80 |
| Inorganic filler | Aluminum hydroxide Wet synthesis type (3) | 0 | 0 | 0 | 20 | 0 | 0 | 0 | 0 | 0 | 0 | 0 | 0 | 0 | 0 | 0 | 0 |
| | Wet synthesis type (2) | 0 | 0 | 0 | 0 | 20 | 0 | 0 | 0 | 0 | 0 | 0 | 0 | 0 | 0 | 0 | 0 |
| | Wet synthesis type (1) | 0 | 0 | 0 | 0 | 0 | 20 | 0 | 0 | 0 | 0 | 0 | 0 | 0 | 0 | 0 | 0 |
| | Ground type (4) | 0 | 0 | 0 | 0 | 0 | 0 | 20 | 0 | 0 | 0 | 0 | 0 | 0 | 0 | 0 | 0 |
| | Ground type (3) | 0 | 0 | 0 | 0 | 0 | 0 | 0 | 20 | 0 | 0 | 0 | 0 | 0 | 0 | 0 | 0 |
| | Ground type (2) | 0 | 0 | 0 | 0 | 0 | 0 | 0 | 0 | 20 | 0 | 0 | 0 | 0 | 0 | 0 | 0 |
| | Ground type (1) | 20 | 0 | 0 | 0 | 0 | 0 | 0 | 0 | 0 | 0 | 0 | 0 | 20 | 20 | 20 | 20 |
| | ATH#B | 0 | 0 | 0 | 0 | 0 | 0 | 0 | 0 | 0 | 20 | 0 | 0 | 0 | 0 | 0 | 0 |
| | Higi H43 | 0 | 0 | 0 | 0 | 0 | 0 | 0 | 0 | 0 | 0 | 20 | 0 | 0 | 0 | 0 | 0 |
| | C-301N | 0 | 0 | 0 | 0 | 0 | 0 | 0 | 0 | 0 | 0 | 0 | 20 | 0 | 0 | 0 | 0 |
| Softener | Process oil TDAE oil C120 | 10 | 10 | 10 | 10 | 10 | 10 | 10 | 10 | 10 | 10 | 10 | 10 | 10 | 10 | 10 | 10 |
| | Resin α-Methylstyrene SA85 | 0 | 0 | 0 | 0 | 0 | 0 | 0 | 0 | 0 | 0 | 0 | 0 | 0 | 0 | 0 | 0 |
| | Koresin | 0 | 0 | 0 | 0 | 0 | 0 | 0 | 0 | 0 | 0 | 0 | 0 | 0 | 0 | 0 | 0 |
| | YS resin TO125 | 5 | 5 | 5 | 5 | 5 | 5 | 5 | 5 | 5 | 5 | 5 | 5 | 5 | 5 | 5 | 5 |
| Chemicals | Zinc oxide F2 | 0 | 0 | 0 | 0 | 0 | 0 | 0 | 0 | 0 | 0 | 0 | 0 | 0 | 0 | 0 | 0 |
| | Ginrei R | 0 | 2.5 | 2.5 | 0 | 0 | 0 | 0 | 0 | 0 | 0 | 0 | 0 | 0 | 0 | 0 | 0 |
| | Silane coupling agent Si75 | 5.6 | 5.6 | 5.6 | 5.6 | 5.6 | 5.6 | 5.6 | 5.6 | 5.6 | 5.6 | 5.6 | 5.6 | 5.6 | 0 | 0 | 0 |
| | NXT | 0 | 0 | 0 | 0 | 0 | 0 | 0 | 0 | 0 | 0 | 0 | 0 | 0 | 4.5 | 4.2 | 5.6 |
| | Antioxidant 6PPD | 3 | 3 | 3 | 3 | 3 | 3 | 3 | 3 | 3 | 3 | 3 | 3 | 3 | 3 | 3 | 3 |
| | TMQ | 1 | 1 | 1 | 1 | 1 | 1 | 1 | 1 | 1 | 1 | 1 | 1 | 1 | 1 | 1 | 1 |
| | Vulcanizing agent Zinc dithiophosphate TP-50 | 6 | 6 | 6 | 6 | 6 | 6 | 6 | 6 | 6 | 6 | 6 | 6 | 6 | 6 | 6 | 6 |
| | Zinc dithiophosphate ZBOP-50 | 0 | 0 | 0 | 0 | 0 | 0 | 0 | 0 | 0 | 0 | 0 | 0 | 0 | 0 | 0 | 0 |
| | Stearic acid | 3 | 3 | 3 | 3 | 3 | 3 | 3 | 3 | 3 | 3 | 3 | 3 | 3 | 3 | 3 | 3 |
| | 5% Oil-containing sulfur powder | 1.30 | 1.30 | 1.30 | 1.30 | 1.30 | 1.30 | 1.30 | 1.30 | 1.30 | 1.30 | 1.30 | 1.30 | 1.30 | 1.30 | 1.30 | 1.30 |
| | Vulcanization accelerator TBBS | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | DPG | 2.5 | 2.5 | 2.5 | 2.5 | 2.5 | 2.5 | 2.5 | 2.5 | 2.5 | 2.5 | 2.5 | 2.5 | 2.7 | 2 | 2 | 2.5 |
| | TBZTD | 0 | 0 | 0 | 0 | 0 | 0 | 0 | 0 | 0 | 0 | 0 | 0 | 0 | 0 | 0.80 | 0 |
| Evaluation | Blowing resistance (target: ≥120) | 155 | 100 | 107 | 154 | 154 | 155 | 157 | 157 | 155 | 154 | 155 | 155 | 159 | 151 | 145 | 145 |
| | Wet grip index (target: ≥105) | 117 | 100 | 100 | 104 | 104 | 107 | 109 | 115 | 112 | 110 | 107 | 103 | 106 | 135 | 145 | 113 |
| | Abrasion index (target: ≥105) | 116 | 100 | 102 | 92 | 96 | 98 | 101 | 111 | 111 | 109 | 105 | 92 | 118 | 109 | 105 | 112 |

TABLE 2

| | | | Ex. 10 | Com. Ex. 8 | Ex. 11 | Ex. 12 | Ex. 13 | Ex. 14 | Com. Ex. 9 | Ex. 15 | Ex. 16 | Ex. 17 | Ex. 18 | Ex. 19 | Com. Ex. 10 | Ex. 20 | Ex. 21 | Ex. 22 | Ex. 23 |
|---|---|---|---|---|---|---|---|---|---|---|---|---|---|---|---|---|---|---|---|
| Rubber component | SBR | Modified SBR 1 | 137.5 | 137.5 | 137.5 | 137.5 | 137.5 | 137.5 | 137.5 | 0 | 68.75 | 96.25 | 137.5 | 137.5 | 137.5 | 137.5 | 137.5 | 137.5 | 137.5 |
| | | Silica-modified SBR 2 | 0 | 0 | 0 | 0 | 0 | 0 | 0 | 100 | 0 | 0 | 0 | 0 | 0 | 0 | 0 | 0 | 0 |
| | BR | NS612 | 0 | 0 | 0 | 0 | 0 | 0 | 0 | 0 | 50 | 0 | 0 | 0 | 0 | 0 | 0 | 0 | 0 |
| | | CB24 | 0 | 0 | 0 | 0 | 0 | 0 | 0 | 0 | 0 | 30 | 0 | 0 | 0 | 0 | 0 | 0 | 0 |
| Carbon black or silica | | EB201 | 0 | 0 | 0 | 0 | 0 | 0 | 0 | 0 | 0 | 0 | 25 | 0 | 0 | 0 | 0 | 0 | 0 |
| | | HP180 | 25 | 25 | 25 | 25 | 25 | 25 | 25 | 25 | 25 | 25 | 0 | 0 | 0 | 5 | 0 | 25 | 25 |
| | | HP160 | 0 | 0 | 0 | 0 | 0 | 0 | 0 | 0 | 0 | 0 | 0 | 25 | 0 | 0 | 35 | 0 | 0 |
| | | N110 | 0 | 0 | 0 | 0 | 0 | 0 | 0 | 0 | 0 | 0 | 0 | 0 | 25 | 0 | 0 | 0 | 0 |
| | | VN3 | 80 | 80 | 80 | 80 | 80 | 80 | 80 | 80 | 80 | 80 | 80 | 80 | 80 | 110 | 60 | 80 | 90 |
| Inorganic filler | Aluminum hydroxide | Wet synthesis type (3) | 0 | 0 | 0 | 0 | 0 | 0 | 0 | 0 | 0 | 0 | 0 | 0 | 0 | 0 | 0 | 0 | 0 |
| | | Wet synthesis type (2) | 0 | 0 | 0 | 0 | 0 | 0 | 0 | 0 | 0 | 0 | 0 | 0 | 0 | 0 | 0 | 0 | 0 |
| | | Wet synthesis type (1) | 0 | 0 | 0 | 0 | 0 | 0 | 0 | 0 | 0 | 0 | 0 | 0 | 0 | 0 | 0 | 0 | 0 |
| | | Ground type (4) | 0 | 0 | 0 | 0 | 0 | 0 | 0 | 0 | 0 | 0 | 0 | 0 | 0 | 0 | 0 | 0 | 0 |
| | | Ground type (3) | 0 | 0 | 0 | 0 | 0 | 0 | 0 | 0 | 0 | 0 | 0 | 0 | 0 | 0 | 0 | 0 | 0 |
| | | Ground type (2) | 20 | 20 | 20 | 20 | 20 | 20 | 20 | 20 | 20 | 20 | 20 | 20 | 20 | 20 | 20 | 20 | 20 |
| | | Ground type (1) | 0 | 0 | 0 | 0 | 0 | 0 | 0 | 0 | 0 | 0 | 0 | 0 | 0 | 0 | 0 | 0 | 0 |
| | | ATH#B | 0 | 0 | 0 | 0 | 0 | 0 | 0 | 0 | 0 | 0 | 0 | 0 | 0 | 0 | 0 | 0 | 0 |
| | | Higi H43 | 0 | 0 | 0 | 0 | 0 | 0 | 0 | 0 | 0 | 0 | 0 | 0 | 0 | 0 | 0 | 0 | 0 |
| | | C-301N | 0 | 0 | 0 | 0 | 0 | 0 | 0 | 0 | 0 | 0 | 0 | 0 | 0 | 0 | 0 | 0 | 0 |
| Softener | Process oil | TDAE oil | 0 | 0 | 0 | 0 | 0 | 0 | 0 | 27.5 | 8.75 | 16.25 | 0 | 0 | 0 | 0 | 0 | 0 | 25 |
| | | C120 | 0 | 0 | 0 | 0 | 0 | 0 | 0 | 0 | 0 | 0 | 0 | 0 | 0 | 0 | 0 | 0 | 10 |
| | | α-Methylstyrene | 10 | 10 | 10 | 10 | 10 | 10 | 10 | 10 | 10 | 10 | 10 | 10 | 10 | 10 | 15 | 10 | 10 |
| | Resin | SA85 | 0 | 0 | 0 | 0 | 0 | 0 | 0 | 10 | 10 | 10 | 0 | 0 | 0 | 0 | 0 | 0 | 10 |
| | | Koresin | 5 | 5 | 5 | 5 | 5 | 5 | 5 | 5 | 5 | 5 | 5 | 5 | 5 | 5 | 5 | 5 | 10 |
| Chemicals | Zinc oxide | F2 | 0 | 0 | 0 | 0 | 0 | 0 | 0 | 0 | 0 | 0 | 0 | 0 | 0 | 0 | 0 | 0 | 0 |
| | | Ginrei R | 2 | 3 | 1 | 0 | 0 | 0 | 0 | 0 | 0 | 0 | 0 | 0 | 0 | 0 | 0 | 0 | 0 |
| | Silane coupling agent | Si75 | 0 | 0 | 0 | 0 | 0 | 0 | 0 | 0 | 0 | 0 | 0 | 0 | 0 | 0 | 0 | 6.4 | 0 |
| | | NXT | 5.6 | 5.6 | 5.6 | 5.6 | 5.6 | 5.6 | 5.6 | 5.6 | 5.6 | 5.6 | 5.6 | 5.6 | 5.6 | 7.7 | 4.2 | 0 | 7.2 |
| | Antioxidant | 6PPD | 3 | 3 | 3 | 3 | 3 | 3 | 3 | 3 | 3 | 3 | 3 | 3 | 3 | 3 | 3 | 3 | 3 |
| | | TMQ | 1 | 1 | 1 | 1 | 1 | 1 | 1 | 1 | 1 | 1 | 1 | 1 | 1 | 1 | 1 | 1 | 1 |

TABLE 2-continued

| | | Ex. 10 | Com. Ex. 8 | Ex. 11 | Ex. 12 | Ex. 13 | Ex. 14 | Com. Ex. 9 | Ex. 15 | Ex. 16 | Ex. 17 | Ex. 18 | Ex. 19 | Com. Ex. 10 | Ex. 20 | Ex. 21 | Ex. 22 | Ex. 23 |
|---|---|---|---|---|---|---|---|---|---|---|---|---|---|---|---|---|---|---|
| Vulcanizing agent | Zinc dithiophosphate TP-50 | 6 | 6 | 1 | 4 | 10 | 20 | 32 | 6 | 6 | 6 | 6 | 6 | 6 | 6 | 6 | 6 | 6 |
| | Zinc dithiophosphate ZBOP-50 | 0 | 0 | 0 | 0 | 0 | 0 | 0 | 0 | 0 | 0 | 0 | 0 | 0 | 0 | 0 | 0 | 0 |
| | Stearic acid | 3 | 3 | 3 | 3 | 3 | 3 | 3 | 3 | 3 | 3 | 3 | 3 | 3 | 3 | 3 | 3 | 3 |
| | 5% Oil-containing sulfur powder | 1.10 | 1.00 | 1.30 | 1.30 | 1.30 | 0.80 | 0.80 | 1.30 | 1.30 | 1.30 | 1.30 | 1.30 | 1.30 | 1.30 | 1.30 | 1.30 | 1.30 |
| Vulcanization accelerator | TBBS | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | DPG | 2.5 | 2.5 | 2.5 | 2.5 | 2 | 0 | 0 | 2.5 | 2.5 | 2.5 | 2.5 | 2.5 | 2.5 | 3.3 | 2 | 2.5 | 2.5 |
| | TBZTD | 0 | 0 | 0 | 0 | 0 | 0 | 0 | 0 | 0 | 0 | 0 | 0 | 0 | 0 | 0 | 0 | 0 |
| Evaluation | Blowing resistance (target: ≥120) | 132 | 112 | 120 | 135 | 157 | 160 | 165 | 170 | 165 | 160 | 154 | 140 | 157 | 165 | 150 | 150 | 145 |
| | Wet grip index (target: ≥105) | 112 | 109 | 108 | 114 | 114 | 110 | 107 | 106 | 112 | 108 | 113 | 120 | 121 | 124 | 106 | 116 | 130 |
| | Abrasion index (target: ≥105) | 109 | 104 | 113 | 115 | 115 | 106 | 87 | 106 | 109 | 125 | 124 | 110 | 103 | 105 | 137 | 110 | 107 |

TABLE 3

| | | | Ex. 24 | Ex. 25 | Ex. 26 | Ex. 27 | Ex. 28 | Ex. 29 | Ex. 30 |
|---|---|---|---|---|---|---|---|---|---|
| Rubber component | SBR | Modified SBR 1 | 137.5 | 137.5 | 137.5 | 137.5 | 137.5 | 137.5 | 137.5 |
| | | Silica-modified SBR 2 | 0 | 0 | 0 | 0 | 0 | 0 | 0 |
| | | NS612 | 0 | 0 | 0 | 0 | 0 | 0 | 0 |
| | BR | CB24 | 0 | 0 | 0 | 0 | 0 | 0 | 0 |
| Carbon black or silica | | EB201 | 0 | 0 | 0 | 0 | 0 | 0 | 0 |
| | | HP180 | 100 | 100 | 100 | 100 | 100 | 25 | 25 |
| | | HP160 | 0 | 0 | 0 | 0 | 0 | 0 | 0 |
| | | N110 | 0 | 0 | 0 | 0 | 0 | 0 | 0 |
| | | VN3 | 0 | 0 | 0 | 0 | 0 | 80 | 80 |
| Inorganic filler | Aluminum hydroxide | Wet synthesis type (3) | 0 | 0 | 0 | 0 | 0 | 0 | 0 |
| | | Wet synthesis type (2) | 0 | 0 | 0 | 0 | 0 | 0 | 0 |
| | | Wet synthesis type (1) | 0 | 0 | 0 | 0 | 0 | 0 | 0 |
| | | Ground type (4) | 0 | 0 | 0 | 0 | 0 | 0 | 0 |
| | | Ground type (3) | 0 | 0 | 0 | 0 | 0 | 0 | 0 |
| | | Ground type (2) | 20 | 20 | 20 | 20 | 20 | 20 | 20 |
| | | Ground type (1) | 0 | 0 | 0 | 0 | 0 | 0 | 0 |
| | | ATH#B | 0 | 0 | 0 | 0 | 0 | 0 | 0 |
| | | Higi H43 | 0 | 0 | 0 | 0 | 0 | 0 | 0 |
| | | C-301N | 0 | 0 | 0 | 0 | 0 | 0 | 0 |
| Softener | Process oil | TDAE oil | 20 | 20 | 20 | 20 | 40 | 0 | 0 |
| | Resin | C120 | 20 | 20 | 20 | 20 | 0 | 0 | 0 |
| | | α-Methylstyrene SA85 | 0 | 0 | 0 | 0 | 10 | 10 | 0 |
| | | Koresin | 20 | 20 | 20 | 20 | 5 | 0 | 0 |
| | | YS resin TO125 | 0 | 0 | 0 | 0 | 15 | 5 | 5 |
| Chemicals | Zinc oxide | F2 | 0 | 1 | 2 | 0 | 0 | 0 | 0 |
| | | Ginrei R | 0 | 0 | 0 | 0 | 0 | 0 | 0 |
| | Silane coupling agent | Si75 | 0 | 0 | 0 | 0 | 0 | 0 | 0 |
| | | NXT | 0 | 0 | 0 | 0 | 0 | 5.6 | 5.6 |
| | Antioxidant | 6PPD | 3 | 3 | 3 | 3 | 3 | 3 | 3 |
| | | TMQ | 1 | 1 | 1 | 1 | 1 | 1 | 1 |
| | Vulcanizing agent | Zinc dithiophosphate TP-50 | 6 | 6 | 6 | 0 | 6 | 6 | 6 |
| | | Zinc dithiophosphate ZBOP-50 | 0 | 0 | 0 | 6 | 0 | 0 | 0 |
| | | Stearic acid | 3 | 3 | 3 | 3 | 3 | 2 | 1 |
| | | 5% Oil-containing sulfur powder | 1.10 | 1.10 | 0.90 | 1.10 | 1.10 | 1.30 | 1.30 |
| | Vulcanization accelerator | TBBS | 5 | 5 | 5 | 5 | 5 | 2.5 | 2.5 |
| | | DPG | 0 | 0 | 0 | 0 | 0 | 2.5 | 2.5 |
| | | TBZTD | 2 | 2 | 2 | 2 | 2 | 0 | 0 |
| Evaluation | | Blowing resistance (target: ≥120) | 155 | 145 | 137 | 155 | 175 | 150 | 120 |
| | | Wet grip index (target: ≥105) | 107 | 105 | 105 | 106 | 105 | 117 | 110 |
| | | Abrasion index (target: ≥105) | 114 | 108 | 105 | 112 | 110 | 116 | 108 |

| | | | Com. Ex. 11 | Com. Ex. 12 | Com. Ex. 13 | Com. Ex. 14 | Com. Ex. 15 |
|---|---|---|---|---|---|---|---|
| Rubber component | SBR | Modified SBR 1 | 137.5 | 137.5 | 137.5 | 137.5 | 137.5 |
| | | Silica-modified SBR 2 | 0 | 0 | 0 | 0 | 0 |
| | | NS612 | 0 | 0 | 0 | 0 | 0 |
| | BR | CB24 | 0 | 0 | 0 | 0 | 0 |
| Carbon black or silica | | EB201 | 0 | 0 | 0 | 0 | 0 |
| | | HP180 | 100 | 100 | 100 | 100 | 100 |
| | | HP160 | 0 | 0 | 0 | 0 | 0 |
| | | N110 | 0 | 0 | 0 | 0 | 0 |
| | | VN3 | 0 | 0 | 0 | 0 | 0 |
| Inorganic filler | Aluminum hydroxide | Wet synthesis type (3) | 0 | 0 | 0 | 0 | 0 |
| | | Wet synthesis type (2) | 0 | 0 | 0 | 0 | 0 |
| | | Wet synthesis type (1) | 0 | 0 | 0 | 0 | 0 |
| | | Ground type (4) | 0 | 0 | 0 | 0 | 0 |
| | | Ground type (3) | 0 | 0 | 0 | 0 | 0 |
| | | Ground type (2) | 20 | 20 | 20 | 0 | 0 |

TABLE 3-continued

|  |  |  | Ex. 24 | Ex. 25 | Ex. 26 | Ex. 27 | Ex. 28 | Ex. 29 | Ex. 30 |
|---|---|---|---|---|---|---|---|---|---|
|  |  | Ground type (1) |  |  | 0 | 0 | 0 | 0 | 0 |
|  |  | ATH#B |  |  | 0 | 0 | 0 | 0 | 0 |
|  |  | Higi H43 |  |  | 0 | 0 | 0 | 0 | 0 |
|  |  | C-301N |  |  | 0 | 0 | 0 | 0 | 0 |
| Softener | Process oil | TDAE oil |  |  | 20 | 20 | 20 | 20 | 40 |
|  | Resin | C120 |  |  | 20 | 20 | 20 | 20 | 0 |
|  |  | α-Methylstyrene SA85 |  |  | 0 | 0 | 0 | 0 | 0 |
|  |  | Koresin |  |  | 20 | 20 | 20 | 20 | 5 |
|  |  | YS resin TO125 |  |  | 0 | 0 | 0 | 0 | 15 |
| Chemicals | Zinc oxide | F2 |  |  | 2 | 3 | 5 | 0 | 0 |
|  |  | Ginrei R |  |  | 0 | 0 | 0 | 0 | 0 |
|  | Silane coupling agent | Si75 |  |  | 0 | 0 | 0 | 0 | 0 |
|  |  | NXT |  |  | 0 | 0 | 0 | 0 | 0 |
|  | Antioxidant | 6PPD |  |  | 3 | 3 | 3 | 3 | 3 |
|  |  | TMQ |  |  | 1 | 1 | 1 | 1 | 1 |
|  | Vulcanizing agent | Zinc dithiophosphate TP-50 |  |  | 0 | 6 | 6 | 6 | 6 |
|  |  | Zinc dithiophosphate ZBOP-50 |  |  | 0 | 0 | 0 | 0 | 0 |
|  |  | Stearic acid |  |  | 3 | 3 | 3 | 3 | 3 |
|  |  | 5% Oil-containing sulfur powder |  |  | 1.10 | 0.90 | 0.90 | 1.10 | 1.10 |
|  | Vulcanization accelerator | TBBS |  |  | 5 | 5 | 5 | 5 | 5 |
|  |  | DPG |  |  | 0 | 0 | 0 | 0 | 0 |
|  |  | TBZTD |  |  | 2 | 2 | 2 | 2 | 2 |
| Evaluation |  | Blowing resistance (target: ≥120) |  |  | 100 | 125 | 115 | 155 | 175 |
|  |  | Wet grip index (target: ≥105) |  |  | 100 | 98 | 87 | 90 | 91 |
|  |  | Abrasion index (target: ≥105) |  |  | 100 | 97 | 89 | 109 | 113 |

The evaluation results shown in Tables 1 to 3 demonstrate that the blowing resistance target (120), the wet grip performance target (105), and the abrasion resistance target (105) were achieved in the examples in which zinc dithiophosphate and sulfur were incorporated with a rubber component including a diene rubber, the zinc oxide content was adjusted to below a certain level, and an inorganic filler having specific BET value and linseed oil absorption ranges were incorporated.

The invention claimed is:

1. A rubber composition for treads, comprising:
a diene rubber including styrene-butadiene rubber;
zinc dithiophosphate;
an inorganic filler which comprises at least one selected from the group consisting of a compound represented by the formula below, magnesium sulfate, and silicon carbide, and has a BET value of 5 to 120 m²/g and a linseed oil absorption of 30 to 80 mL/100 g; and
sulfur,
wherein, per 100 parts by mass of the diene rubber, there are 0.2 to 15 parts by mass of the zinc dithiophosphate, 1 to 70 parts by mass of the inorganic filler, and less than 2.5 parts by mass of zinc oxide,
the formula being

$mM \cdot xSiO_y \cdot zH_2O$ wherein M represents at least one metal selected from the group consisting of Al, Mg, Ti, Ca, and Zr, or an oxide or hydroxide of the metal; m represents an integer of 1 to 5; x represents an integer of 0 to 10; y represents an integer of 2 to 5; and z represents an integer of 0 to 10.

2. The rubber composition for treads according to claim 1, wherein the inorganic filler has a BET value of 10 to 120 m²/g and a linseed oil absorption of 30 to 80 mL/100 g.

3. The rubber composition for treads according to claim 1, wherein the inorganic filler is aluminum hydroxide.

4. The rubber composition for treads according to claim 1, wherein the diene rubber includes 60% by mass or more of a styrene-butadiene rubber having a styrene content of 19% to 60%.

5. The rubber composition for treads according to claim 1, wherein the rubber composition comprises a carbon black having a BET value of 151 m²/g or more in an amount of 5 to 130 parts by mass per 100 parts by mass of the diene rubber.

6. The rubber composition for treads according to claim 1, wherein the rubber composition is free of zinc oxide.

7. A pneumatic tire, comprising a tread formed from the rubber composition for treads according to claim 1.

* * * * *